US012691316B2

(12) United States Patent
Vespermann et al.

(10) Patent No.: US 12,691,316 B2
(45) Date of Patent: Jul. 28, 2026

(54) MONITORING AND EXTINGUISHING DEVICE

(71) Applicant: Fagus-GreCon Greten GmbH & Co. KG, Alfeld (DE)

(72) Inventors: Nils Vespermann, Giesen (DE); Michael Mehlhorn, Bad Gandersheim (DE); Mario Haas, Hildesheim (DE); Marco Kulhawy, Steyerberg (DE)

(73) Assignee: Fagus-GreCon Greten GmbH & Co. KG, Alfeld (DE)

(*) Notice: Subject to any disclaimer, the term of this patent is extended or adjusted under 35 U.S.C. 154(b) by 317 days.

(21) Appl. No.: 18/251,575

(22) PCT Filed: Sep. 30, 2021

(86) PCT No.: PCT/DE2021/000159
§ 371 (c)(1),
(2) Date: May 3, 2023

(87) PCT Pub. No.: WO2022/096045
PCT Pub. Date: May 12, 2022

(65) Prior Publication Data
US 2024/0009497 A1 Jan. 11, 2024

(30) Foreign Application Priority Data
Nov. 3, 2020 (DE) .................... 10 2020 006 743.3

(51) Int. Cl.
*A62C 35/68* (2006.01)
*A62C 37/38* (2006.01)

(52) U.S. Cl.
CPC ............. *A62C 35/68* (2013.01); *A62C 37/38* (2013.01)

(58) Field of Classification Search
CPC ................................ A62C 35/68; A62C 37/38
USPC .................................. 169/16, 69, 70, 60, 61
See application file for complete search history.

(56) References Cited

U.S. PATENT DOCUMENTS 5,740,867 A * 4/1998 Jansson ............. A62C 99/0018 169/61
7,221,281 B1 5/2007 Young
10,773,113 B2 9/2020 Pohl
(Continued)

FOREIGN PATENT DOCUMENTS

CN 206777636 U 12/2017
CN 109481881 A 3/2019
CN 211798373 U 10/2020
(Continued)

*Primary Examiner* — Christopher S Kim
(74) *Attorney, Agent, or Firm* — Laurence A. Greenberg; Werner H. Stemer; Ralph E. Locher

(57) ABSTRACT

A device for monitoring and controlling the extinguishment of a source of fire or the like in a conveyed material flowing in a pipeline. Danger sources are detected by a sensor system and controlled by introducing a fire extinguishing agent via extinguishing nozzles embedded in the pipe wall. For this purpose, a main controller and a large number of decentralized monitoring devices are provided for monitoring the functioning of each valve unit and of an extinguishing nozzle that is connected downstream to the valve of each valve unit and is to be supplied with the fire extinguishing agent. In the process, feedback is sent from the monitoring device to the central main controller.

15 Claims, 2 Drawing Sheets

(56) References Cited

U.S. PATENT DOCUMENTS

| | | | |
|---|---|---|---|
| 11,199,441 | B2 | 12/2021 | Lommatzsch |
| 2009/0189773 | A1 | 7/2009 | Hansen et al. |

FOREIGN PATENT DOCUMENTS

| | | | |
|---|---|---|---|
| DE | 19735067 | A1 | 2/1999 |
| DE | 202013006142 | U1 | 10/2013 |
| DE | 102014226639 | A1 | 6/2016 |
| WO | 2019024953 | A1 | 2/2019 |

* cited by examiner

MONITORING AND EXTINGUISHING DEVICE

FIELD AND BACKGROUND OF THE INVENTION

The invention relates to a device for monitoring and controlling the extinguishment of a source of fire or comparable sources of danger for flammable transported goods, in particular bulk goods, flowing in a pipeline, in which potential sources of danger are also detected by means of a sensor system and are tackled by introducing an extinguishing agent via extinguishing nozzles embedded in the pipeline.

Various embodiments of extinguishing methods are known. DE 10 2014 226 639 A1 thus discloses a fire protection apparatus for a central unit of an electronic data processing system, in which the temperature of an air flow emerging from a housing is monitored. If a maximum temperature is exceeded, the housing of the central unit is flooded with an extinguishing gas.

DE 10 2014 226 639 A1 also discloses a valve having a housing in which a pressure sensor is integrated. This valve is used to apply an extinguishing agent to a multiplicity of sprinkler nozzles.

Such extinguishing methods are not suitable for monitoring and extinguishing flammable transported goods within a pipeline. Devices required for this purpose are nevertheless known and established. In this case, sensors are embedded in the pipe wall in a manner following one another in the direction of flow of the transported goods, which sensors can detect glowing embers, sparks, sources of fire or similar sources of danger. For example, purely optical sensors are disclosed in the utility model DE 20 2013 006 142 U1, but thermal or active sensors are also known and the latter are explained in WO 2019/024953 A1, for example.

Like the sensors, extinguishing nozzles are also embedded in the pipe wall in a manner following one another in the direction of flow of the transported goods, which extinguishing nozzles are used to introduce an extinguishing agent for the purpose of tackling a source of danger. For this purpose, a controller uses the sensor system to successively capture a source of danger, and the extinguishing agent for extinguishing a source of fire, for example, is then respectively applied to an extinguishing nozzle which is downstream in the transport direction.

A special feature of such extinguishing nozzles, known for example from the utility model DE 20 2016 003 551 U1, is that they open only when the extinguishing agent is applied under pressure. Only then does the extinguishing agent enter the pipeline.

However, the maintenance and servicing of such fire extinguishing devices need to be carried out manually in situ and are therefore laborious. However, statements about the state and the functionality of the overall system are possible only on account of these measures.

SUMMARY OF THE INVENTION

This forms the starting point for the invention in order to provide a user with the possibility of monitoring the state and the functionality of the fire extinguishing device as completely as possible and in an automated manner and, in particular, in order to quickly identify the possible cause of a fault in the event of malfunctions.

This technical problem is solved in the extinguishing method explained at the outset by means of the features as claimed.

The device according to the invention for monitoring and controlling the extinguishment of a source of fire or the like for flammable transported goods flowing in a pipeline provides a multiplicity of advantages.

Although the device also uses a central main controller to detect and extinguish a source of fire, this main controller according to the invention takes into account a multiplicity of further parameters which hitherto have not been included in the known prior art.

A multiplicity of decentralized monitoring devices for monitoring in each case the function of a valve unit having at least one valve are therefore provided. This relates, in particular, to the monitoring of the functionality of the valve. This is also associated with monitoring the function of the at least one extinguishing nozzle which is connected downstream of the valve and to which the extinguishing agent is to be applied.

The device allows, in particular, feedback of a fault during an extinguishing operation from the monitoring device to the central main controller. The latter can then take into account the malfunction of a valve unit, for example by controlling a further valve unit which is downstream in the transport direction of the transported goods.

As part of the monitoring, a first pressure sensor is first of all provided upstream of the valve, and a second pressure sensor is provided downstream of the valve, for determining the existing pressure. This measure allows the opening of the valve during an extinguishing operation to be determined since a pressure drop can be detected at the first pressure sensor when the valve is opened. The magnitude of the pressure drop can already indicate, to a certain extent, the function of the valve in terms of whether the valve is completely or only partially open.

However, the flow rate may be determined in an even more accurate manner with the aid of the differential pressure between the first and the second pressure sensor. In particular, a statement about the functionality of the at least one extinguishing nozzle is therefore also possible, for example, to the effect of whether this extinguishing nozzle opens and extinguishing agent is therefore introduced into the pipeline.

The second pressure sensor is advantageously also used to determine a leak of the valve. However, this is possible only when, as explained at the outset, the extinguishing nozzle is normally closed, with the result that, in the event of a leak, only a slight pressure of the extinguishing agent builds up in the connection between the valve and the extinguishing nozzle on account of the leak, which pressure does not suffice, on the one hand, to open the extinguishing nozzle but, on the other hand, can be detected by the second pressure sensor.

In a structurally advantageous manner, the two pressure sensors and the valve can form a structural unit.

In order to optimize the extinguishing operation, the physical and/or chemical properties of the extinguishing agent are monitored by the central main controller. Water with additives is often used as the extinguishing agent. A constant concentration of these additives is expedient for extinguishing a source of fire, glowing embers or the like and may be monitored by sensors, for example by determining a conductance of the extinguishing agent. Further sensors are used to monitor the degree of hardness or the ion content, for example.

In a further configuration of the device according to the invention, a solenoid valve of the valve unit is provided and is switched by the main controller via an electronic switch, and the delay time of the solenoid coil is less than 1 ms.

The solenoid valve of the valve unit is switched, while circumventing the monitoring device, via an electronic switch. This ensures very fast switching, with the result that the delay time of the solenoid coil is less than 1 ms.

Fast reactions in the case of transport speeds of certainly 30 m/s for pipe diameters of 500 mm with an appropriate axial distance between the sensors and extinguishing nozzles in the transport direction are imperative for effectively extinguishing a source of fire, for example. MOSFETs, for example, provide such fast switching, even in the case of a comparatively large electrical load.

This measure also allows the solenoid coil to be fed from a separate voltage source, if appropriate.

The use of electrically actuated solenoid valves has further advantages since, by virtue of appropriate electrical wiring, current and voltage values can be delivered to the monitoring unit. Such tapping-off of the electrical characteristic values can be conventionally effected using voltage dividers and shunt resistors. If these measured values for the current and voltage are outside predefined standards, this can indicate a malfunction of the magnet and/or of the solenoid valve.

In particular, it is then also possible to ultimately monitor the functionality of the valve and/or of the extinguishing nozzle. This relates both to the mechanical wear and to encrustations which may be produced at high temperatures by limescale deposits, or to blockages which may be caused by material entering when the extinguishing nozzle is open. The monitoring can be carried out with the aid of a current characteristic curve which was generated, for example, from empirical values from endurance tests. If the electrical characteristic variables are captured each time the valve is switched, these actual values can be compared by a microprocessor, μC, of the monitoring device with the target values of the corresponding characteristic curve. Deviations of the values from one another indicate a fault source.

In order to assess the functionality of the valve, the number of its switching cycles is also important, with the result that the number thereof is stored by the microprocessor of the monitoring device. Accordingly, it is possible to easily determine whether a predefined lifetime of the valve has been reached.

A further measure provides for the temperature of the environment and/or of the valve to be measured by a temperature sensor of the monitoring device. The alternative will be dependent on the predefined buildings. The monitoring of the temperature is important, in particular, when a membrane which is fully functional only in a predefined temperature range is provided for the valve.

In order to maintain and service the valve unit and the extinguishing nozzle, it is expedient to be able to separate them from a central supply of an extinguishing agent. It is therefore advantageous to arrange a shut-off element upstream of the valve in the flow direction of the extinguishing agent, the position of which shut-off element is captured by the monitoring device. It can therefore be ensured that the shut-off element is also open again for correct operation after servicing.

Even if the main controller indicates a fault on the basis of the feedback from a monitoring device, it is expedient that such a fault can also be directly indicated by or read from an output device for a fault analysis that is connected to the housing of the monitoring device. A simple technical implementation may be effected by connecting a multicolor display. This prevents searching for a relatively long time in the case of a multiplicity of monitoring devices of a relatively long pipeline.

In the case of such a multicolor display, the intention is preferably to also display different faults using different colors and/or in a flashing manner. For this purpose, it is possible to use, for example, a multicolor LED which emits light into an optical conductor ending outside the housing of the monitoring device.

As an alternative, it is possible to provide, possibly additionally, an interface which can be used to read data. An instruction can then be immediately proposed in conjunction with a suitable app on a smartphone or a tablet.

Such a housing and its electrical connections of the monitoring device are explosion-proof on account of the exposed arrangement.

The device according to the invention is explained in more detail on the basis of the drawing, the single drawing of which represents the interaction according to the invention of the individual components in the form of a circuit diagram.

DETAILED DESCRIPTION OF THE INVENTION

Figure 1:
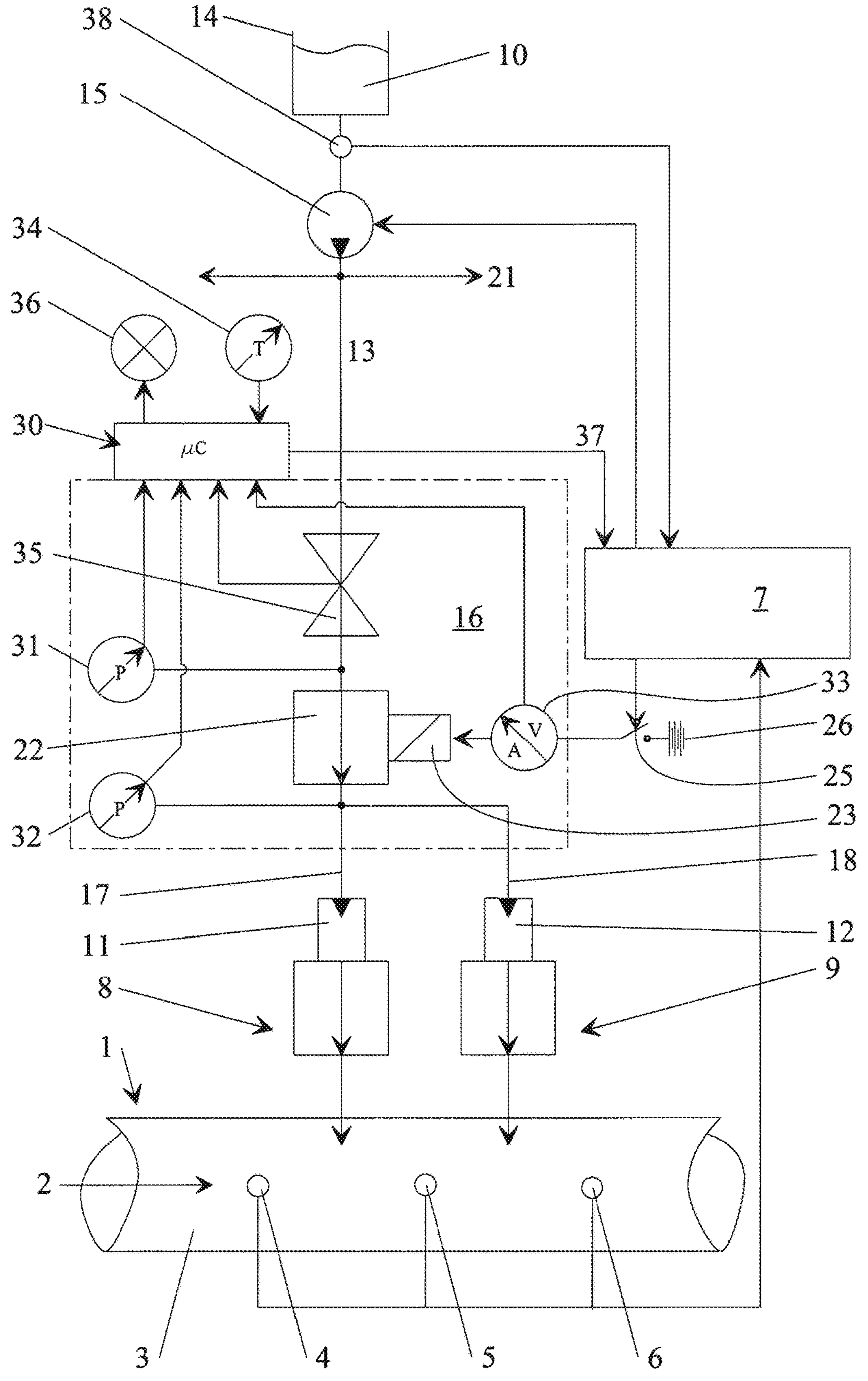
FIG. 1 indicates a section of a pipeline 1 in which flammable transported goods, such as bulk goods, flow in the direction of the arrow 2. Three sensors 4-6 are embedded here by way of example in the pipe wall 3. A main controller 7 detects sparks, glowing embers, fires or similar sources of danger in the transported goods by means of the sensors 4-6.

If such a source of danger is detected, the main controller 7 initiates an extinguishing operation. In this case, an extinguishing agent 10 is introduced into the pipeline 1 by extinguishing nozzles 8, 9 which are embedded in the pipe wall 3 downstream of the sensors 4-6 in the direction of flow according to arrow 2.

The extinguishing nozzles 8, 9 have a valve function and are closed during normal operation. The extinguishing valves 8, 9 switch to passage, indicated by the switching symbols 11, 12, only when the pressurized extinguishing agent 10 is applied to them.

A source of danger within the pipeline 1 must be tackled quickly. Long pipelines 13 between a reservoir 14 for the extinguishing agent 10 and a pump 15 that builds up an extinguishing pressure and is controlled by the main controller 7 should therefore be avoided. A valve unit 16 which is illustrated using dot-dashed lines the figure is therefore arranged immediately upstream of the extinguishing nozzles 8, 9 in the immediate spatial vicinity. The pipelines 17, 18 connecting the valve unit 16 to the downstream extinguishing nozzles 8, 9 may therefore be kept accordingly short.

A multiplicity of such valve units with downstream extinguishing nozzles which are fed by the pump 15, indicated by the double-headed arrow 21, are found over the entire length of the pipeline 1.

Each valve unit 16 has a valve 22 which is closed during normal operation. In the event of a fire etc., the main controller 7 opens the valve 22 electromagnetically, here by means of a solenoid coil 23. The extinguishing agent 10 is therefore applied to the extinguishing nozzles 8, 9. The solenoid coil 23 is switched on very quickly by the main controller 7 via an electronic switch 25, with the result that the delay time of the solenoid coil 23 is very short, in particular less than 1 ms. As indicated in the figure, the solenoid coil 23 may possibly also be connected to an external voltage source 26 by means of the switch 25.

The functionality of the valve 22 and of the extinguishing nozzles 8, 9 is decisively important for tackling a source of danger. A monitoring device 30 arranged in the immediate vicinity of the valve unit 16 monitors the functionality of the latter.

For this purpose, a first pressure sensor 31 is provided upstream of the valve 22 in the flow direction according to the arrow and a second pressure sensor 32 is provided downstream of the valve 22 in the flow direction. If there is a pressure drop at the first pressure sensor 31, this is an indication to the monitoring device 30 that the valve 22 has been opened. A malfunction of the valve 22, for example incomplete opening, may already be inferred by comparing the pressure drop measured by the first pressure sensor 31 with a predefined target value.

Forming the difference between the values measured by the first pressure sensor 31 and the values measured by the second pressure sensor 32 allows a flow rate of the extinguishing agent 10 to be determined and therefore also indicates whether the extinguishing nozzles 8, 9 have opened.

In particular, the pressure measurement using the second pressure sensor 32 also allows a leak of a closed valve 22 to be determined. Since the extinguishing nozzles 8, 9 are closed during normal operation, a pressure will build up in the lines 17, 18 toward the extinguishing nozzles 8, 9 in the event of a leak of the valve 22 and this pressure build-up signals such a leak of the valve 22 to the monitoring device 30.

The electrical characteristic variables of current and voltage are also monitored by means of only indicated wiring 33 when the solenoid coil 23 is excited. Deviations from predefined characteristic curves allow conclusions to be drawn about wear of the valve 22 and also a defect of the solenoid coil 23. The number of switching cycles of the valve 22 can also be determined using this monitoring, with the result that necessary replacement of the valve is indicated, for example, when a number of cycles predefining the lifetime of the valve is reached.

A temperature sensor 34 is also provided for the purpose of monitoring the temperature of the environment and/or of the valve 22. It can therefore be ensured that the valve unit 16 and, in particular, the valve 22 are operated in a correct temperature window.

A shut-off element 35 is also provided upstream of the valve 22. A closed shut-off element 35 allows the valve 22 and the extinguishing nozzles 8, 9 to be easily maintained and serviced. After maintenance or servicing, the shut-off element 35 needs to be opened again in order to ensure the functionality of the fire extinguishing system overall. The position of the shut-off element 35 is therefore also monitored by the monitoring device 30.

If the monitoring device 30 identifies defects, these are indicated by an optical multicolor display 36 assigned to the housing of the monitoring device 30, with the result that it is easily possible to identify a faulty valve unit 16 in the case of a multiplicity of such units and the fault which has occurred can be quickly identified by means of an assigned color. In addition, a fault is indicated to the main controller 7, indicated by the arrow 37. Such a fault can then not only be centrally indicated by the main controller 7, but such a failure will also be taken into account during an extinguishing operation in which valve units which are downstream in the transport direction according to arrow 2 are addressed by the main controller 7.

So that the main controller 7 can carry out an extinguishing operation in an optimum manner, the physical and/or chemical properties of the extinguishing agent 10 are monitored by a sensor 38. This contributes to the main controller 7 being able to further optimize the duration of the extinguishing operation and the amount of extinguishing agent 10.

Figure 2:
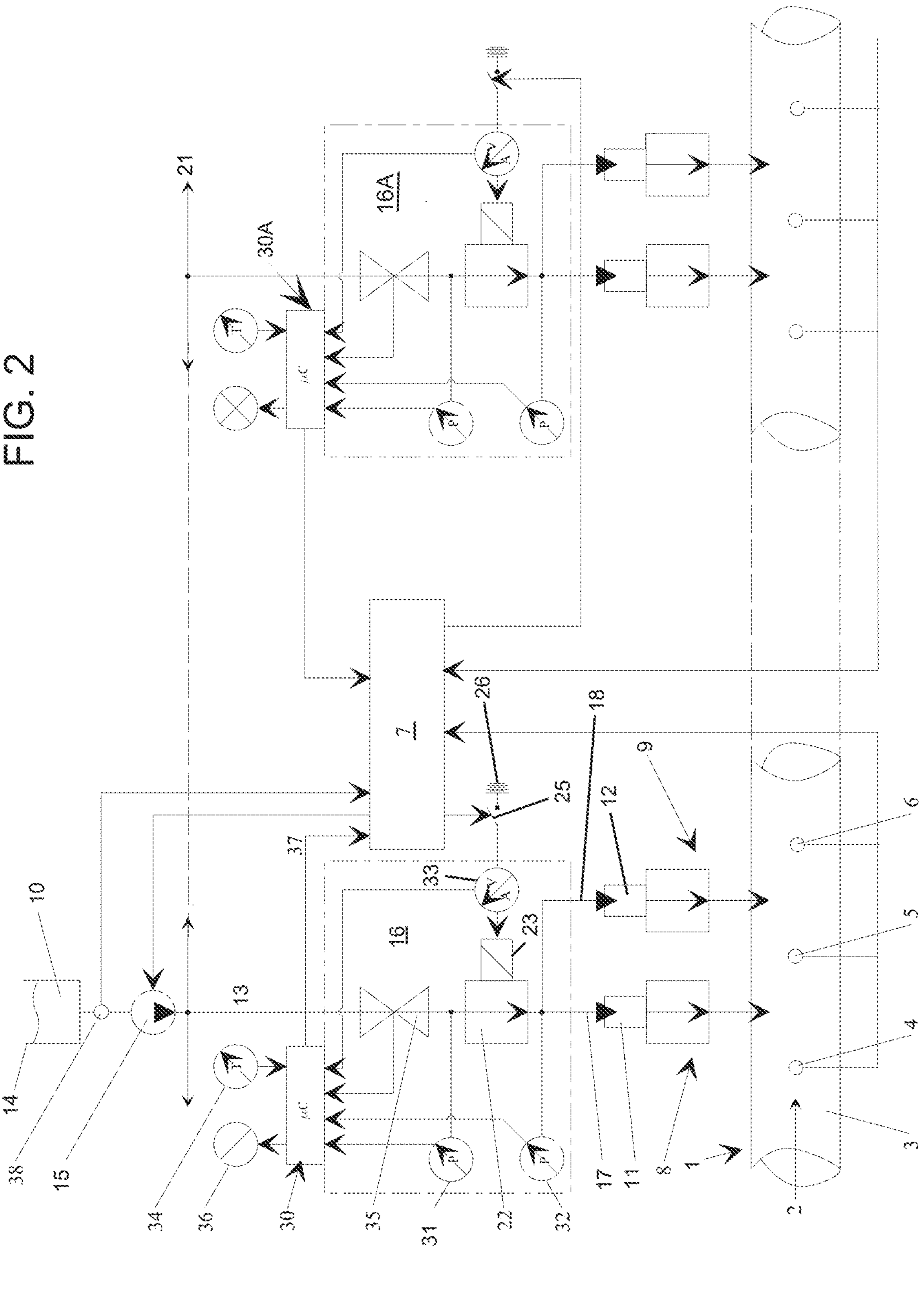
FIG. 2 indicates a larger section of the pipeline.

FIG. 2 shows a larger section of pipeline 1 shown in FIG. 1. A monitoring device 30A is arranged in the immediate vicinity of the valve unit 16A to monitor the functionality of the latter.

The invention claimed is:

1. A device for monitoring and controlling an extinguishment of a source of a danger for flammable goods flowing in a pipeline, wherein sensors are successively disposed in a direction of a flow of the flammable goods for detecting the source of the danger and wherein an extinguishing nozzle for introducing an extinguishing agent is disposed downstream of each of the sensors, and each of the extinguishing nozzles is embedded in a pipe wall of the pipeline and is configured to open when a pressure is applied, wherein the source of the danger is at least one source selected from the group consisting of a spark, glowing embers, and a fire, the device comprising:

- a central main controller configured for successively detecting and extinguishing the source of the danger by way of a respective one of the extinguishing nozzles which is downstream of a respective one of the sensors in a direction of the flow of the flammable goods in the pipeline;
- a multiplicity of decentralized monitoring devices, each one of said multiplicity of decentralized monitoring devices configured for monitoring a function of a respective valve unit and at least one of the extinguishing nozzles that is connected downstream from a valve of the respective valve unit and to which the extinguishing agent is to be applied; and
- a respective feedback from each one of said multiplicity of decentralized monitoring devices to said central main controller.

2. The device according to claim 1, which comprises a first pressure sensor upstream of a said valve, and a second pressure sensor downstream of said valve, for determining at least one of the following: an existing pressure, an opening of the valve during an extinguishing operation, a flow rate during an extinguishing operation, or a leak of the valve.

3. The device according to claim 2, wherein said first and second pressure sensors and said valve form a structural unit.

4. The device according to claim 1, wherein said central main controller is configured to monitor physical and/or chemical properties of the extinguishing agent.

5. The device according to claim 1, wherein said respective valve unit includes a solenoid valve to be switched by said main controller via an electronic switch, and wherein a delay time of a solenoid coil of said solenoid valve is less than 1 ms.

6. The device according to claim 1, wherein said respective valve unit includes an electrical solenoid valve which, by virtue of an electrical wiring thereof, delivers current and voltage values to an associated one of said multiplicity of decentralized monitoring devices.

7. The device according to claim 1, wherein one of said multiplicity of decentralized monitoring devices has a microcontroller configured for monitoring a functionality of said valve and/or of said at least one of said extinguishing nozzles by comparing actual variables with predefined characteristic curves.

8. The device according to claim 1, wherein a number of switching cycles of said valve is stored in a memory.

9. The device according to claim 1, wherein said monitoring device has a temperature sensor configured for measuring an ambient temperature or a temperature of said valve.

10. The device according to claim 1, which comprises a shut-off element arranged upstream of said valve in a flow direction of the extinguishing agent.

11. The device according to claim 1, wherein an output device for a fault analysis is connected to a housing of said monitoring device.

12. The device according to claim 1, wherein said monitoring device has a housing, and said housing with electrical connections thereof are explosion-proof.

13. The device according to claim 1, wherein the pipeline is configured to transport flammable bulk goods and the source of a danger is a source of fire.

14. An assembly, comprising:

a pipeline for transporting flammable goods;

a plurality of sensors successively disposed in a transport direction of the goods for detecting potential sources of dangers, wherein each of the potential sources of the dangers is independently selected from the group consisting of a spark, glowing embers, and a fire;

extinguishing nozzles embedded in a pipe wall of said pipeline, said extinguishing nozzles being configured to introduce an extinguishing agent into said pipeline;

a central main controller configured for successively detecting and extinguishing at least one of the potential sources of the dangers by way of a respective one of said extinguishing nozzles located downstream of a respective one of plurality of sensors in the transport direction;

a multiplicity of decentralized monitoring devices, each configured for monitoring a function of a valve unit, which has a valve, and at least one of said extinguishing nozzles that is connected downstream from the valve of said valve unit and to which the extinguishing agent is to be applied; and a feedback connection from each of said multiplicity of decentralized monitoring devices to said central main controller.

15. A device for monitoring and controlling an extinguishment of a source of a fire for flammable goods flowing in a pipeline, wherein sensors are successively disposed in a direction of a flow of the flammable goods for detecting the source of the fire and wherein a plurality of extinguishing nozzles include an extinguishing nozzle for introducing an extinguishing agent disposed downstream of each of the sensors, and each of the plurality of extinguishing nozzles is embedded in a pipe wall of the pipeline and is configured to open when a pressure is applied, the device comprising:

a central main controller configured for successively detecting and extinguishing the source of the fire by way of a respective one of the plurality of extinguishing nozzles which is downstream of a respective one of the sensors in the direction of the flow of the flammable goods in the pipeline;

a decentralized monitoring device configured for monitoring a function of a valve unit and at least one of the plurality of extinguishing nozzles that is connected downstream from a valve of the valve unit and to which the extinguishing agent is to be applied; and a feedback from said decentralized monitoring device to said central main controller.

* * * * *